Nov. 20, 1923.                                                            1,474,680
                         R. N. LYON
                       CHAIN CONNECTER
                     Filed Dec. 30, 1922
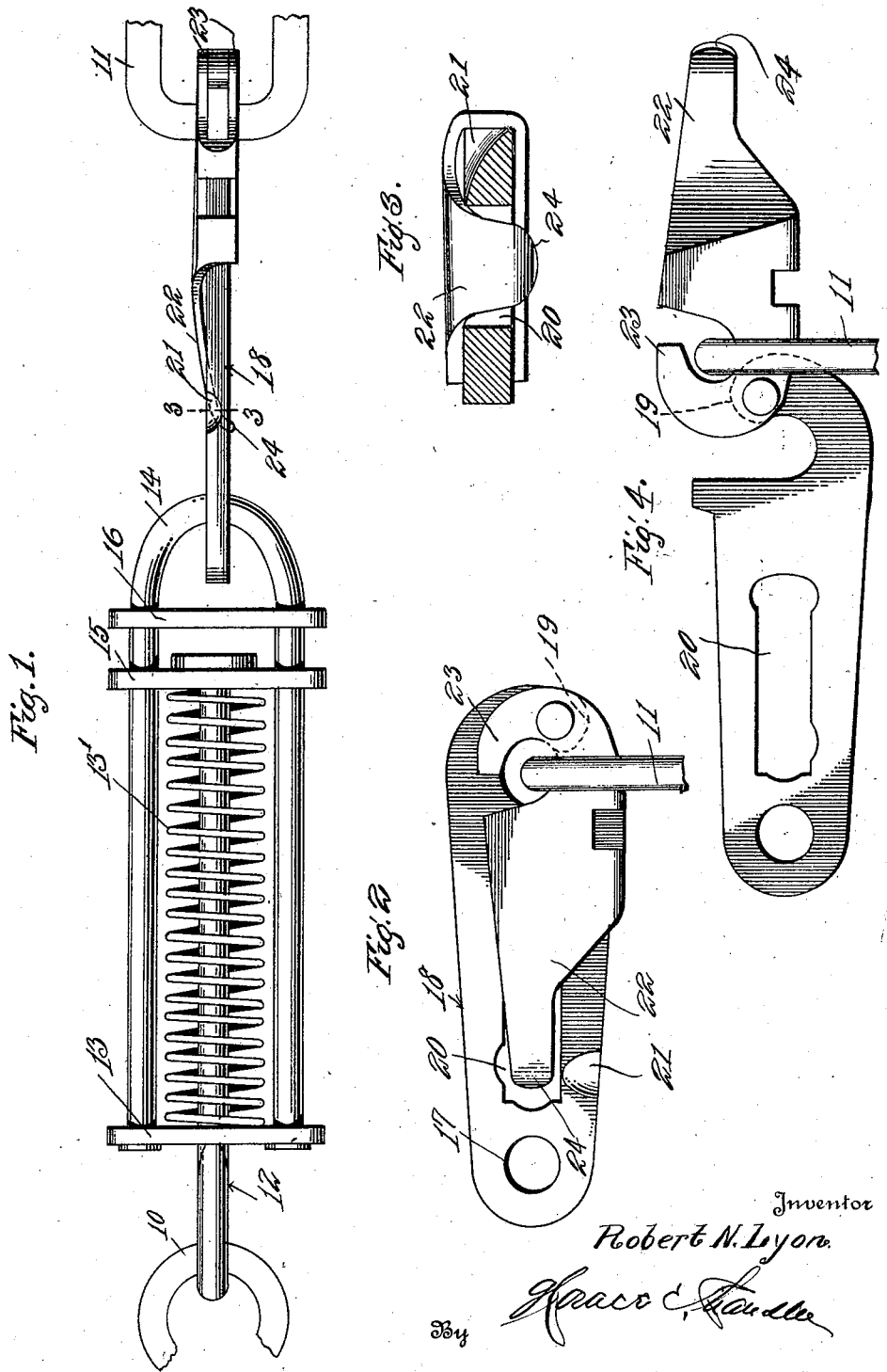

Patented Nov. 20, 1923.

1,474,680

UNITED STATES PATENT OFFICE.

ROBERT N. LYON, OF COEUR D'ALENE, IDAHO, ASSIGNOR OF ONE-THIRD TO CHARLES M. ALLEN, OF COEUR D'ALENE, IDAHO.

CHAIN CONNECTER.

Application filed December 30, 1922. Serial No. 609,996.

*To all whom it may concern:*

Be it known that I, ROBERT N. LYON, a citizen of the United States, residing at Coeur d'Alene, in the county of Kootenai, State of Idaho, have invented certain new and useful Improvements in Chain Connecters; and I do hereby declare the following to be a full, clear, and exact description of the invention, such as will enable others skilled in the art to which it appertains to make and use the same.

This invention relates to new and useful improvements in connecters and particularly to connecters for the anti-skid chains used on automobile wheels.

One object of the invention is to provide a connecter which is simple in construction, and which is strong and durable, as well as easy of operation.

Another object is to provide a device of this character which can be easily and quickly opened, and which will not be easily opened by accident.

Other objects and advantages will be apparent from the following description when taken in connection with the accompanying drawing.

In the drawing:

Figure 1 is a side elevation of the connecter in operative position.

Figure 2 is an enlarged perspective view of the connecter.

Figure 3 is a vertical transverse sectional view on the line 3—3 of Figure 2, showing the guiding notch for the end of the locking lever.

Figure 4 is a perspective view of the connecter in open position.

Referring particularly to the accompanying drawing, 10 and 11 represent the ends of the chains to be connected, and in connection with which the present invention is used.

Connected to the end 10 is a headed bolt 12, which is slidably disposed through the center of a plate 13 carried by the ends of the yoke 14, and between the legs of which yoke the bolt moves. Carried by the other or headed end of the bolt is a similar plate 15, which receives the legs of the yoke through its ends, and on which legs it is slidable. A coil spring encircles the bolts between the plates 13 and 15. A spreader plate 16, is disposed between the legs, adjacent the bight portion of the yoke.

The bight portion of the yoke is loosely disposed through the eye portion 17 of a connecter hook 18. The other end of the hook member 18 is formed with a hook bill 19, and longitudinally of the body there is formed an elongated opening 20. In one edge of the body of the hook, adjacent one end of the opening 20, there is formed a transverse inclined notch 21, the purpose of which will presently appear. Pivoted to the outer end of the body, inwardly of the bill of the hook, is the locking lever 22, the same being formed, on its pivotal portion, with a hook 23 for the reception of the link of the end 11 of the chain, said lever being arranged to be swung rearwardly to draw the link into the hook or bill portion 19. The lever is preferably formed from a single piece of sheet metal doubled and disposed in straddling relation to the hook portion of the member 18, with the hooks 23 in the edges of the folded portion, while the other end of the lever has the tail 24, which is curved inwardly toward the body of the member 18, and adapted to ride in the notch 21, and snap into the opening 20. The lever is preferably possessed of a considerable amount of springiness so that it will readily snap into the opening 20 and remain therein against release, under the ordinary operation of the anti-skid chain. To release the lever a screw driver, or like tool. is inserted beneath the curved tail and the same pried out of the opening and the hook lever then swung on its pivot to permit removal of the chain end 11.

The spring 13' serves to maintain the parts under strain, so that all danger of looseness, with the accompanying tendency to detachment are eliminated.

What is claimed is:

1. A chain connecter comprising a body having a hook in one end and an eye in the other end, and an opening intermediate the eye and hook, and a locking lever having a flexible tail formed with a laterally extending terminal arranged to be snapped into the said opening.

2. A chain connecter comprising a body having a hook in one end and an eye in the other end, with an elongated opening longitudinally between the eye and hook, a lever of springy material pivotally mounted on the hook of the body and having a chain link receiving hook in its pivotal portion and a flexible curved tail portion arranged to be sprung into the elongated opening, the body having an inclined notch formed to receive and guide the end of said tail into said opening.

3. A chain connecter comprising a body having a hook at one end and an eye at the other end, the body having an opening intermediate its ends, and a lever pivotally mounted on the hook of the body and having an elongated flexible tail the terminal of which is curved laterally and releasably engaged in said opening, said terminal being directed toward the body.

In testimony whereof, I affix my signature in the presence of two witnesses.

ROBERT N. LYON.

Witnesses:
EZRA R. WHITLA,
GEO. F. McMURTIN.